United States Patent
Liu et al.

(10) Patent No.: US 11,921,255 B2
(45) Date of Patent: Mar. 5, 2024

(54) RESERVOIR MODELING FOR UNCONVENTIONAL RESERVOIRS

(71) Applicant: ConocoPhillips Company, Houston, TX (US)

(72) Inventors: Yongshe Liu, Houston, TX (US); Kevin T. Raterman, Houston, TX (US); Logan A. Warren, Houston, TX (US)

(73) Assignee: CONOCOPHILLIPS COMPANY, Houston, TX (US)

( * ) Notice: Subject to any disclaimer, the term of this patent is extended or adjusted under 35 U.S.C. 154(b) by 330 days.

(21) Appl. No.: 16/862,775

(22) Filed: Apr. 30, 2020

(65) Prior Publication Data
US 2020/0348445 A1 Nov. 5, 2020

Related U.S. Application Data

(60) Provisional application No. 62/840,925, filed on Apr. 30, 2019.

(51) Int. Cl.
*G01V 99/00* (2009.01)
*E21B 49/00* (2006.01)
(Continued)

(52) U.S. Cl.
CPC ............ *G01V 99/005* (2013.01); *E21B 49/00* (2013.01); *E21B 43/26* (2013.01); *E21B 47/002* (2020.05);
(Continued)

(58) Field of Classification Search
CPC ............ G01V 99/005; G01V 2210/646; E21B 49/00; E21B 43/26; E21B 47/002;
(Continued)

(56) References Cited

U.S. PATENT DOCUMENTS 10,787,887 B2 * 9/2020 Pankaj .................... E21B 41/00
2011/0282635 A1 11/2011 Liu et al.
(Continued)

OTHER PUBLICATIONS

Taleghani, Arash Dahi "Analysis of hydraulic fracture propagation in fractured reservoirs: an improved model for the interaction between induced and natural fractures", May 2009 (Year: 2009).*
(Continued)

*Primary Examiner* — Rehana Perveen
*Assistant Examiner* — Troy A Maust
(74) *Attorney, Agent, or Firm* — Polsinelli PC (57) ABSTRACT

Method for modelling a reservoir including receiving a data set relating to one or more wells within a reservoir, processing the data set to identify one or more fractures extending from the one or more wells into the reservoir, categorizing the one or more fractures as principal fractures or secondary fractures, identifying a near well high permeability region for each of the one or more wells, generating a gridded fracture plane of the one or more wells, determining a fracture permeability region, assembling the gridded fracture plane, the fracture permeability regions, and the near well high permeability region for each of the one or more wells, and generating a three-dimensional reservoir model based on the assembled gridded fracture plane for each of the plurality of predetermined depths, the fracture permeability regions, and the near well high permeability region for each of the one or more wells.

21 Claims, 9 Drawing Sheets

(51) Int. Cl.
  *E21B 43/26* (2006.01)
  *E21B 47/002* (2012.01)
  *E21B 47/06* (2012.01)
  *E21B 47/07* (2012.01)
  *E21B 47/11* (2012.01)

(52) U.S. Cl.
  CPC .............. *E21B 47/06* (2013.01); *E21B 47/07* (2020.05); *E21B 47/11* (2020.05); *E21B 2200/20* (2020.05); *G01V 2210/646* (2013.01)

(58) Field of Classification Search
  CPC .......... E21B 47/06; E21B 47/07; E21B 47/11; E21B 2200/20; E21B 43/2605; E21B 43/2607; E21B 43/27; E21B 47/0025; E21B 47/111; E21B 33/00
  See application file for complete search history.

(56) References Cited

U.S. PATENT DOCUMENTS

| | | | | |
|---|---|---|---|---|
| 2012/0080588 | A1* | 4/2012 | Smith, Jr. | G01V 5/101 250/269.6 |
| 2012/0101786 | A1 | 4/2012 | Hu et al. | |
| 2012/0173220 | A1* | 7/2012 | Li | G06F 30/23 703/10 |
| 2012/0265512 | A1 | 10/2012 | Hu et al. | |
| 2013/0110484 | A1 | 5/2013 | Hu et al. | |
| 2015/0039234 | A1* | 2/2015 | Abou-Sayed | G01V 99/00 702/11 |
| 2015/0317419 | A1 | 11/2015 | Jeong et al. | |
| 2017/0011149 | A1 | 1/2017 | Liu et al. | |
| 2017/0315266 | A1* | 11/2017 | Myers | G01V 99/005 |
| 2018/0275301 | A1* | 9/2018 | Ma | G01V 1/345 |
| 2018/0364381 | A1 | 12/2018 | Raterman et al. | |

OTHER PUBLICATIONS

Arvind Harikesavanallur et al., Volumetric Fracture Modeling Approach (VFMA): Incorporating Microseismic Data in the Simulation of Shale Gas Reservoirs, SPE International 134683, SPE Annual Technical Conference and Exhibition held in Florence, Italy, Sep. 19-22, 2010, pp. 1-9.

C.L. Cipolla et al., Seismic-to-Simulation for Unconventional Reservoir Development, SPE International 146876, SPE Reservoir Characterisation and Simulation Conference and Exhibition held in Abu Dhabi, UAE, Oct. 9-11, 2011, pp. 1-23.

Kevin T. Raterman et al., Sampling a Stimulated Rock Volume: An Ea~le Ford Example, Unconventional Resources Technology Conference held in Austin, Texas, USA, Jul. 24-26, 2017, pp. 1-18.

R.S. Taylor et al., Optimization of Horizontal Wellbore and Fracture Spacing Using an Interactive Combination of Reservoir and Fracturing Simulation, CSUG/SPE 137416, Canadian Society for Unconventional Gas, Canadian Unconventional Resources & International Petroleum Conference held in Calgary, Alberta, Canada, Oct. 19-21, 2010, pp. 1-21.

* cited by examiner

RESERVOIR MODELING FOR UNCONVENTIONAL RESERVOIRS

CROSS-REFERENCE TO RELATED APPLICATIONS

This application claims the benefit of U.S. Provisional Application No. 62/840,925, filed Apr. 30, 2019, the content of which are incorporated by reference herein in their entirety.

FIELD

The present application is generally directed to unconventional reservoir modelling. More specifically, in one aspect, this application is directed, in part, to a data driven modelling arrangement for well spatial drainage, well spacing, completion design, and/or well performance.

BACKGROUND

Three dimensional reservoir modeling can provide background information for understanding a reservoir and help determine future production decisions over the life expectancy of a field. Three dimensional models rely on simple uniform fracture distributions which may not accurately represent the reservoir and/or the one or more wells formed therein. These inaccuracies can result in poor forecasting and/or future reservoir decisions.

BRIEF DESCRIPTION OF THE DRAWINGS

Embodiments of the present application are described, by way of example only, with reference to the attached Figures, wherein.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

It should be understood at the outset that although illustrative implementations of one or more embodiments are illustrated below, the disclosed compositions and methods may be implemented using any number of techniques. The disclosure should in no way be limited to the illustrative implementations, drawings, and techniques illustrated herein, but may be modified within the scope of the appended claims along with their full scope of equivalents.

The present disclosure provides system and method for modelling unconventional reservoirs to assist in understanding well spatial drainage, well spacing, completion design, and/or well performance. The system and method can further assist in determining location, well spacing, and/or performance decisions for existing wells and/or future wells. The system can receive a data set of relating one or more wells formed within a subterranean formation of an area of interest. The data set can include production date, pressure data from monitor well gauges, core, images logs, Distributed Acoustic Sensing (DAS), Distributed Temperature Sensing (DTS), Interference test, Tracer, time lapse geochemistry, and/or microseismic. The data set can be of one or more wells formed in subterranean formation within an area of interest of a reservoir. The data set can operably processed by the system to generate a reservoir model and/or make one or more determinations relating to future well placement, production and/or timing decisions, and/or forecasting projections. The system can be implemented by one or more processors.

The system can identify hydraulic fracture(s) within one or more wells represented by the data set. Densely distributed hydraulic fractures can be interpreted with a wide spatial coverage fracture geometry definition. The system can classify the hydraulic fractures as either a Type 1 principal fracture or a Type 2 principal fracture based on a correlation with far field pressure data. Type 1 principal fractures can generally have large fracture length (Xf) and large fracture height (Hf), high fracture conductivity, a reduced stress dependent permeability reduction, drainage in far field, mediates inter well interference and production sharing, and/or non-uniform spacing along lateral well portions. Type 2 principal fractures can have a large fracture length and large fracture height, lower fracture conductivity, strong stress dependent permeability reduction, weak drainage in far field, and/or non-uniform spacing along lateral well portions. Secondary fractures can have a short fracture length and short fracture height, low fracture conductivity, strong stress dependent permeability reduction, densely spaced in a short distance from wells, and/or together with near well principal fractures can cause strong drainage in a short distance from wells.

The system can further identify near well high effective permeability region(s) by using a distributed temperature sensing (DTS) logs and/or history matching the thermal response following hydraulic fracturing operation, which can show the stimulated reservoir volume (SRV) in the near-well region and its related complexity.

The system can start with a bi-wing symmetric planar fracture model and implement irregular fracture shape by defining a fracture region and a non-fracture region on a gridded fracture plane. An elliptical and/or diamond shape (with a major axis Xf and a semi-minor axis Hf) can be used to determined cells within a conductive fracture. The system can represent secondary factors with explicit fracture approach wherein the height and length can be parametrized as a fraction of those principal fractures or as uniform permeability enhancement.

The uniform permeability enhancement replaces the explicit secondary fractures with a uniform permeability enhancement region, thereby reducing the number of grid cells and run time associated therewith. A large Kx-Ky ratio can be used to direct flow moving predominately along the fracture direction.

In at least one instance, the system can implement the same or substantially similar fracture geometries for principal and secondary fractures, unless the data set indicates different geometries are required.

The system can further define a near well high permeability region and several proppant concentration regions along a principal fracture plane. The near well high permeability region can be implemented as a uniform permeability enhancement region with a permeability one to several orders of magnitude higher than matrix permeability. The near well high permeability region typically has a small width. The system can define the varying proppant concentration along a fracture, which is generally inversely related to distance from the well. The data indicates the system can implement three fracture permeability regions along principal fractures: effectively propped inner region, ineffectively propped middle region, outer unpropped region. The effectively propped region can have a higher fracture permeability and lower stress-dependent permeability reduction and drive strong near well drainage. The ineffectively propped region can have intermediate fracture permeability and moderate stress-dependent permeability reduction and mediate inter-well communication. The outer unpropped region can have a much lower fracture permeability and higher stress-dependent permeability reduction while dominating the drainage in the far field areas.

The system can generate a reservoir model based on the data set and accounting for fracture size, shape, type, conductivity along with a near well region high permeability region. The system can model unconventional reservoirs allowing for stimulated rock volume characterization, development spacing decisions (e.g. well placement), completion design optimization and/or performance forecast. It at least one instance, at least one well is placed/formed in a predetermined location based on the reservoir model generated by the system. In another instance, at least one timing decision is determined based on the reservoir model generated by the system. In yet another instance, at least one field development decision is determined based on the reservoir model generated by the system.

Figure 1:
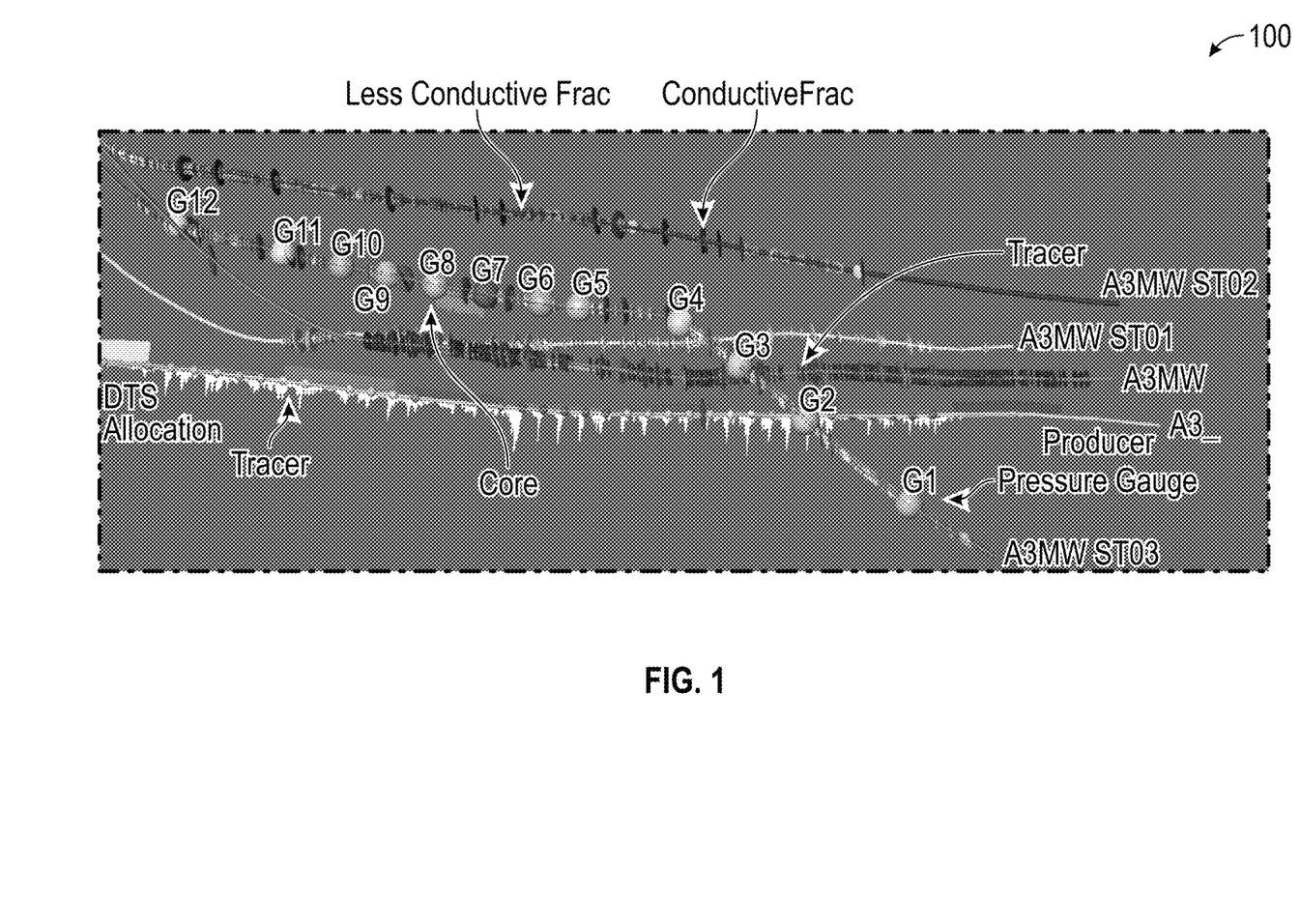
FIG. 1 is a diagrammatic view of a data set of a reservoir according to at least one instance of the present disclosure.

FIG. 1 illustrates a data set of a reservoir according to at least one instance of the present disclosure. The data set 100 can include a variety of data sources including, but not limited to, production data, pressures from monitor well gauges, core, image logs, DAS and/or DTS, interference test, tracer, time lapse geochemistry, and/or micro seismic. As can be appreciated in FIG. 1, the data set 100 can include a plurality of monitor wells. In the illustrated example, four monitor wells (Monitor well 1, Monitor well 2, Monitor well 3, and Monitor well 4) are implemented, however, it is within the scope of this disclosure to implement any number of monitor wells including, but not limited to, one, two, three, five, six, or more monitor wells.

The data set 100 can provide a substantially complete profile of the reservoir to be modelled, thereby the system disclosed herein to generate a model, which can allow decisions regarding well placement, forecasting, completion design, and/or production from one or more wells within the reservoir.

The system 10 disclosed herein can receive the data set 100 and produce a reservoir model, as disclosed in FIGS. 2-9.

Figure 2:
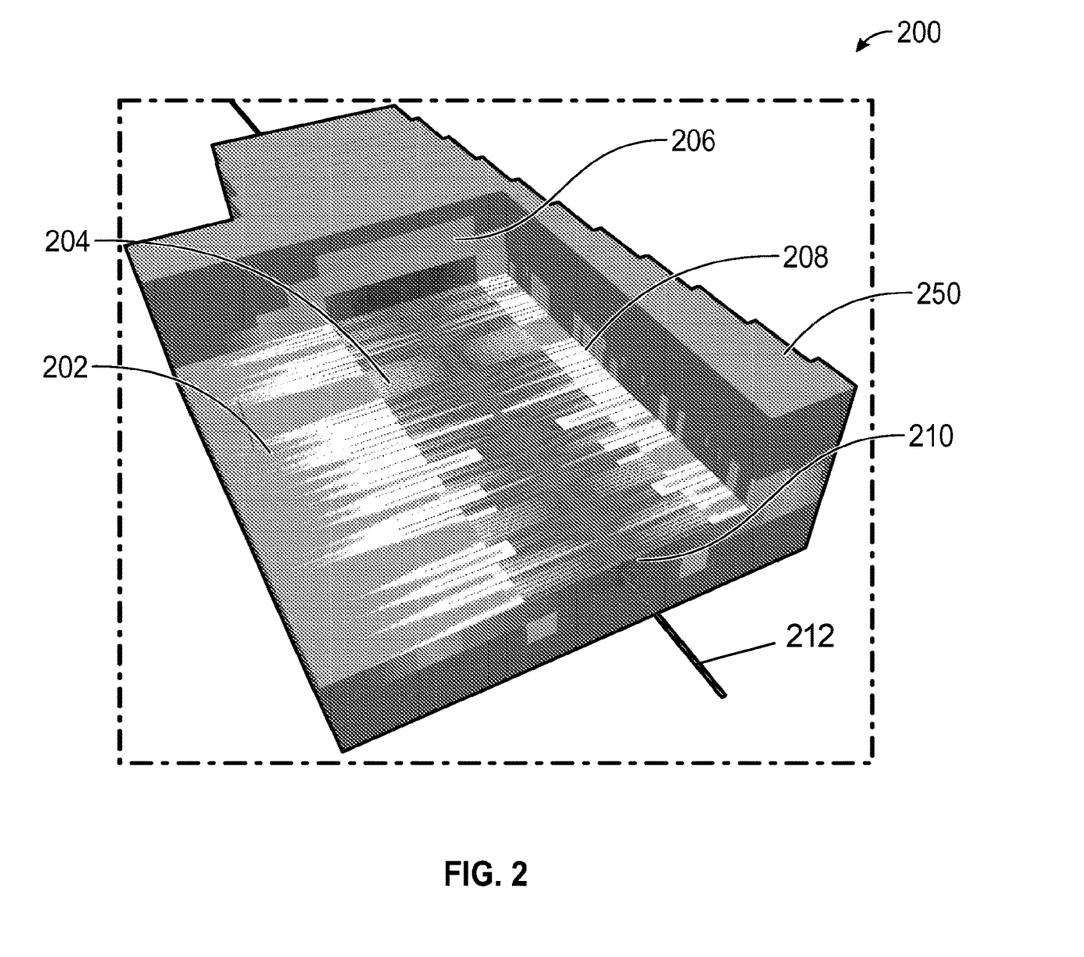
FIG. 2 is diagrammatic view of a reservoir model according to at least one instance of the present disclosure.

FIG. 2 is diagrammatic view of a reservoir model. The reservoir model 200 can detail one or more wells 212 within the reservoir 250 and the associated fractures, fracture size, shape, and/or connectivity. While FIG. 2 illustrates a graphical view of the reservoir model 200, the reservoir model 200 can similarly be a digital representation of the reservoir 250 and data associated with the generated graphical representation.

The reservoir model 200 can illustrate principal fractures 202 and/or secondary fractures 204 formed within a reservoir 250. The principal fractures 202 can be identified based on the fracture height and/or fracture length as provided in the data set 100. The secondary fractures 204 can similarly be determined based on their respective fracture heights and/or fracture lengths.

The reservoir model 200 can illustrate irregular fracture shape 206 and spatially varying density 208. Further, the reservoir model 200 can illustrate fracture conductivity 210 with respect to a distance from the wellbore, thereby displaying complex near-wellbore fracture connections. The reservoir model 200 can provide a digital and/or graphical representation of the reservoir, subterranean formation, and/or area of interest with a field.

The reservoir model 200 provides a more detail than a uniform fracture model while accounting for fracture type and/or fracture size, thereby allow for modelling of unconventional reservoirs. The reservoir model 200 can provide enhanced data points for determination of future well locations and/or well placement to maximize production, while also allowing for enhanced production forecast for both current wells and/or future wells. The digital and/or graphical representation of the reservoir 250 generated by the system 10 can assist operators with one or more drilling decisions, completion decisions, and/or production decisions.

Figure 3:
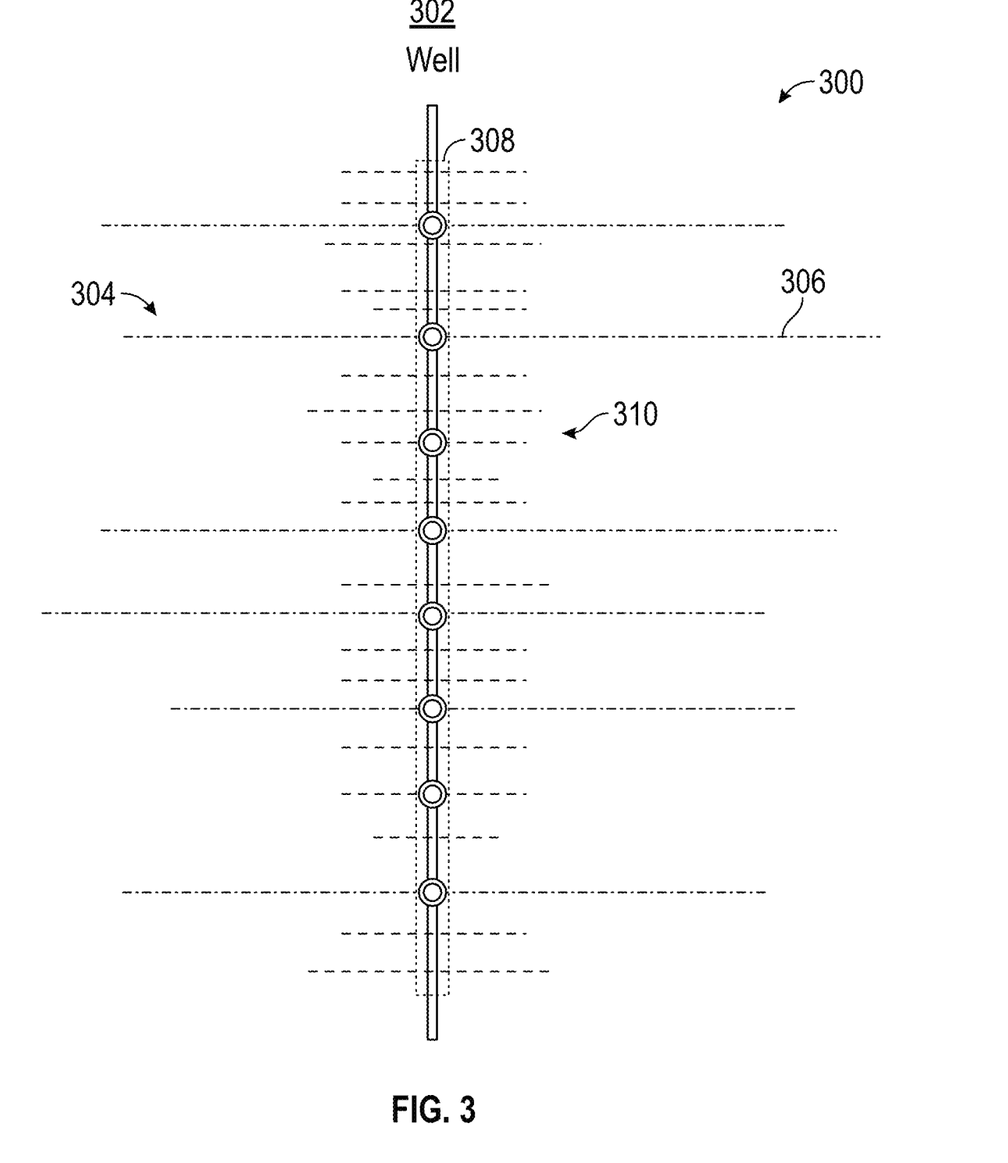
FIG. 3 is a diagrammatic view of a fracture summary according to at least one instance of the present disclosure.

FIG. 3 illustrates a fracture summary according to at least one instance of the present disclosure. The fracture summary 300 is a diagrammatic representation of a wellbore 302 and the associated hydraulic fractures 304 including principal fractures 306 and secondary fractures 310. The fracture summary 300 can further illustrate a near-well high permeability zone 308, which can be a narrow region immediate adjacent to the wellbore 302. The permeability of the near-well high permeability zone 310 can be in the microdarcy range, but the permeability is significantly higher than the matrix permeability of the reservoir.

As illustrated in FIG. 3, the principal fractures 306 can have non-uniform spacing along the length of the wellbore and the number of principal fractures 306 can be a fraction of the number of fractures. The secondary fractures 310 can have a half length (Xfs) shorter than the principal fracture half length (Xfp) and the secondary fractures 310 are densely distributed along the wellbore 302.

While the fracture summary 300 is shown with a substantially vertical wellbore 302, the wellbore 302 can be extend horizontally, vertically and/or any combination thereof.

Figure 4:
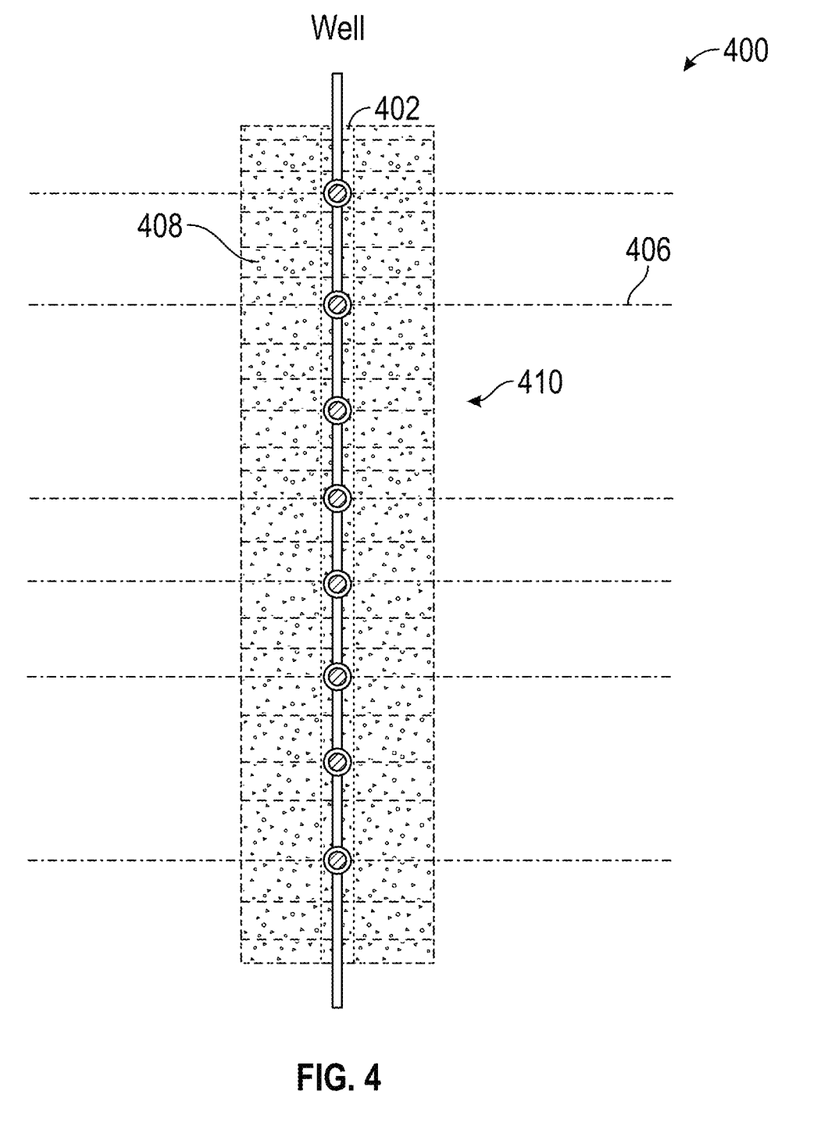
FIG. 4 is a diagrammatic view of a fracture summary having a uniform SRV region according to at least one instance of the present disclosure.

FIG. 4 illustrates a fracture summary having a uniform SRV region according to at least one instance of the present disclosure. The fracture summary 400 can have principal fracture 406 and secondary fractures 408. The fracture summary 400 can represent the secondary fractures 408 with a uniform SRV box 410. As secondary fractures 408 can have significant density within the wellbore 402, the system 10 can simply represent the presence of second fractures 408 by replacing them with a uniform SRV box 410. A large Kx-Ky ratio is used to direct the flow moving predominately along the fracture direction.

Figure 5:
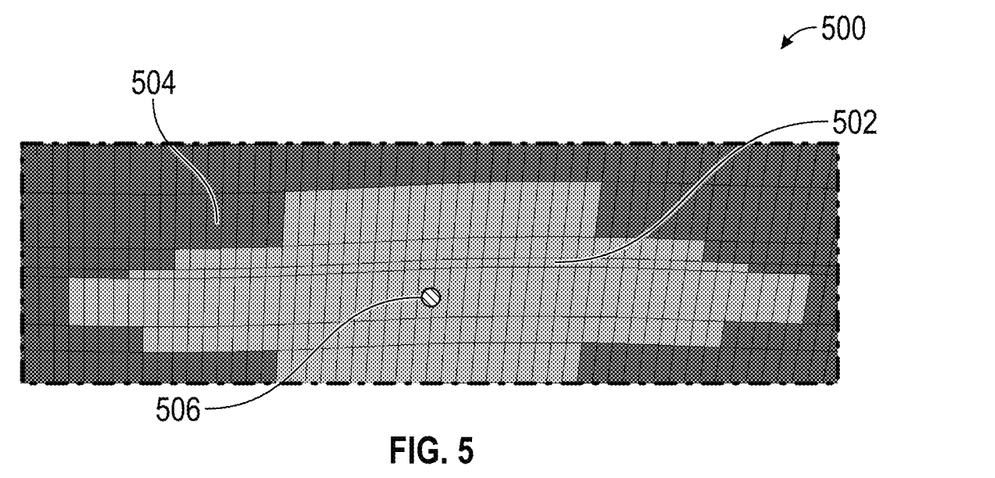
FIG. 5 is a diagrammatic view of a gridded fracture plane of a reservoir model according to at least one instance of the present disclosure.

FIG. 5 illustrates a gridded fracture plane of a reservoir model according to at least one instance of the present disclosure. The system 10 can accommodate irregular fracture shapes by implementing a defined fracture region within a gridded fracture plane 500. The gridded fracture plane 500 can define a fractured region 502 and a non-fractured region 504. The system 10 can implement the gridded fracture plane 500 in generating the reservoir model to assist in understanding the portion of the reservoir fractured with respect to an individual well 506.

As can be appreciated in FIG. 5, the gridded fracture plane 500 represents a fractured region 502 having a substantially diamond or elliptical pattern. The fractured region 502 can propagate away from the well 506 at differing distances based on the formation geometries and/or rock plane stresses.

Figure 6:
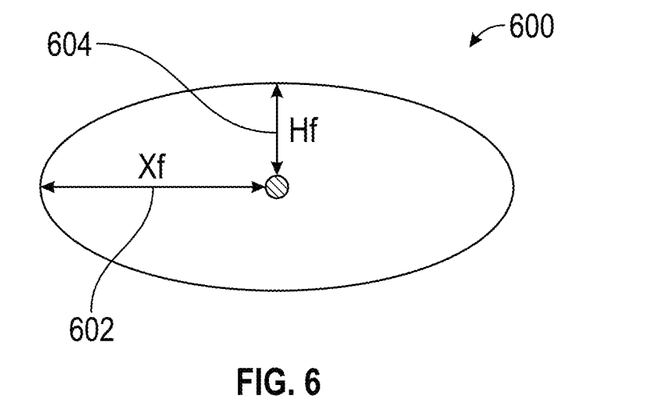
FIG. 6 is a schematic view of a fracture measurement according to at least one instance of the present disclosure.

FIG. 6 illustrates a fracture measurement according to at least one instance of the present disclosure. A fracture measurement 600 can be represented by a semi-major axis of Xf 602 and a semi-minor axis of Hf 604. The semi-major axis 602 can represent fracture half length while the semi-minor axis 604 can represent fracture half height. The fracture measurement 600 can generate a diamond and/or elliptical pattern, which can allow the system 10 to determine cells within a conductive fracture or not.

Figure 7:
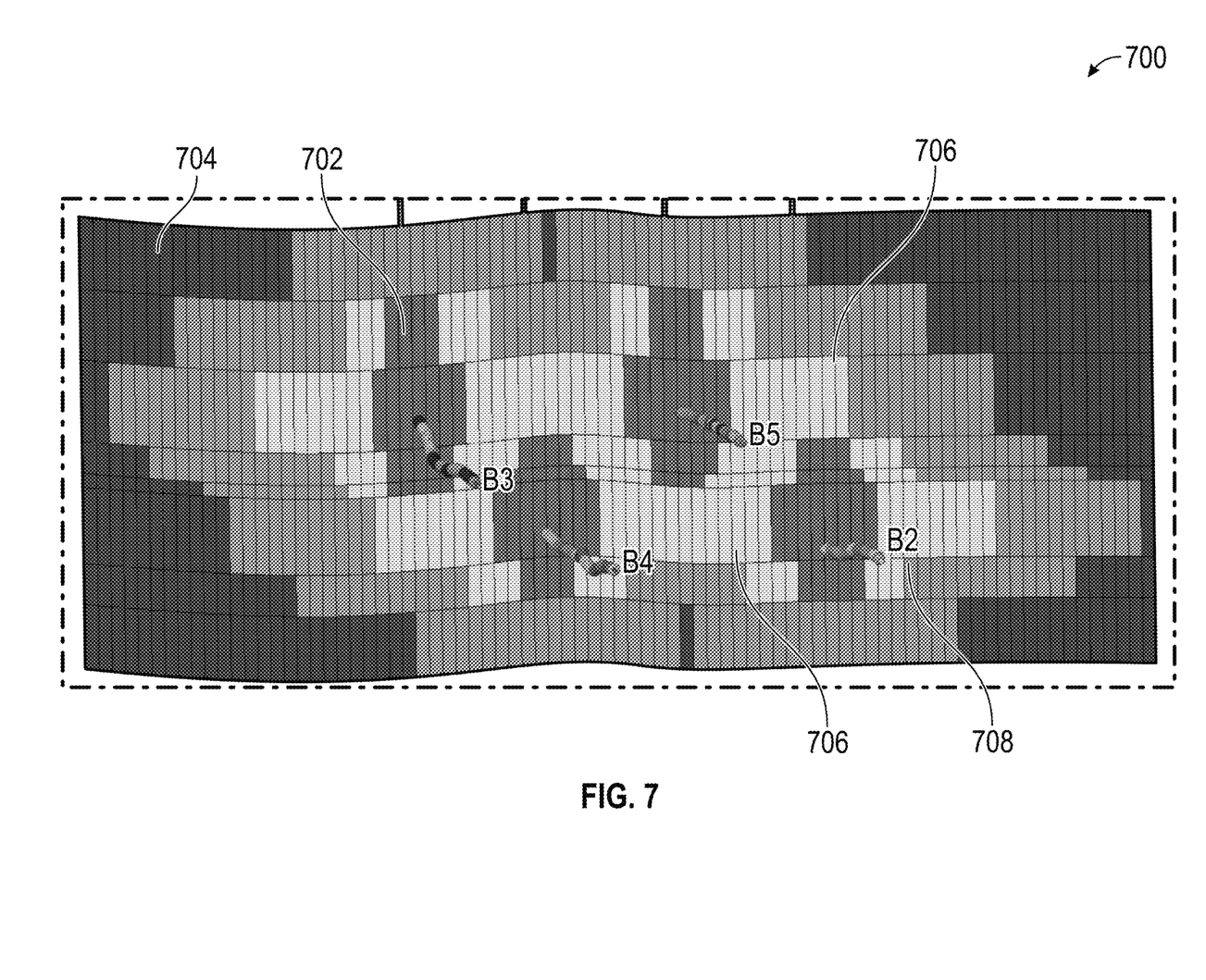
FIG. 7 is a diagrammatic view of a gridded fracture plane of a multi-well reservoir model according to at least one instance of the present disclosure.

FIG. 7 a gridded fracture plane of a multi-well reservoir model according to at least one instance of the present disclosure. A multi-well gridded fracture plane 700 can maintain a substantially similar template implementation by the system when more than one well 708 is present. The multi-well gridded fracture plan 700 can include fractured regions 702, non-fractured regions 704, and fracture overlap regions 706.

Fracture overlap regions 706 can require the system 10 to implement appropriate fracture connection rules to determine permeability and/or connecting fracture percentages to adjust inter-well interference. In at least one instance, the system 10 can include low permeability patches along principal fracture planes to adjust for inter-well interference.

Figure 8:
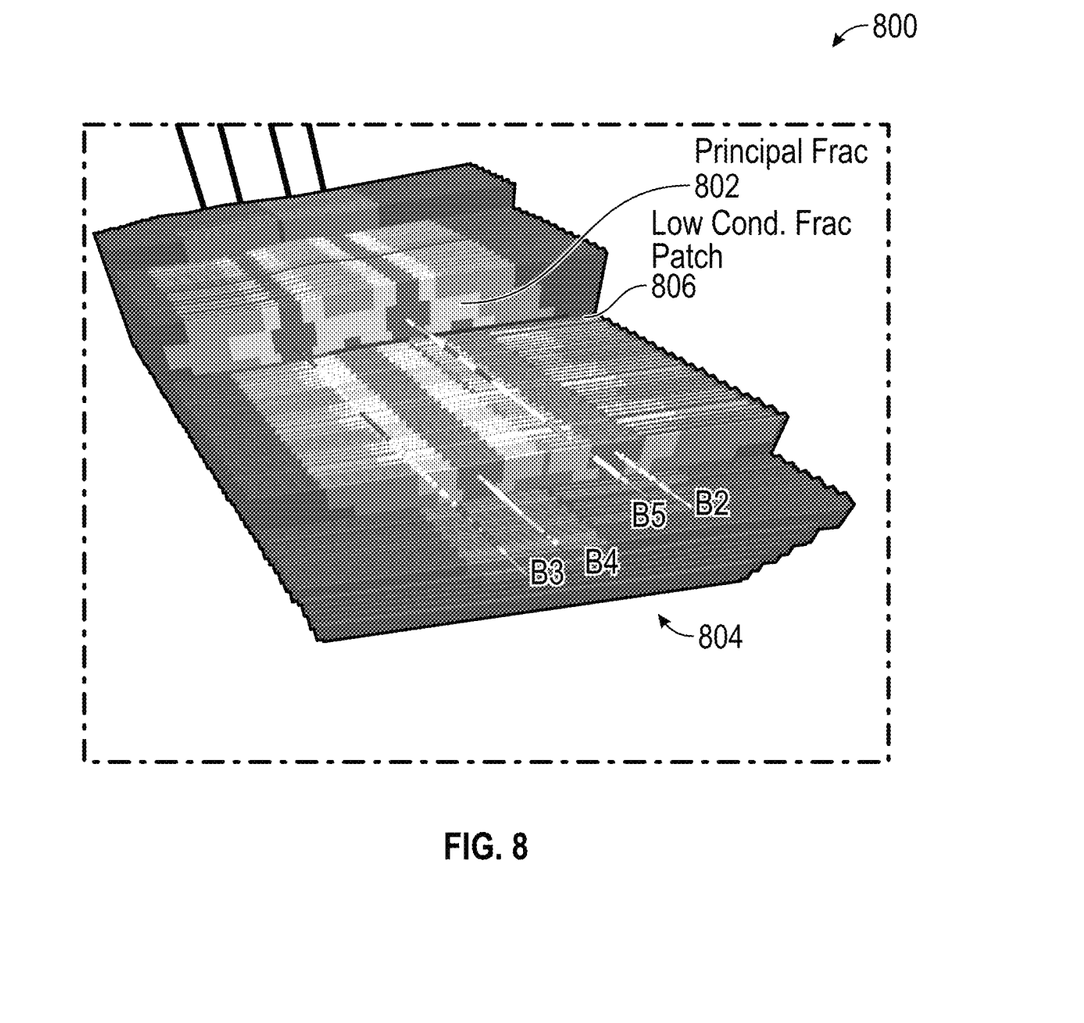
FIG. 8 is a diagrammatic view of a three-dimensional reservoir model detailing principal fractures according to at least one instance of the present disclosure

FIG. 8 illustrates a three-dimensional reservoir model detailing principal fractures according to at least one instance of the present disclosure. The three-dimensional reservoir model 800 can illustrate the principal fracture region 802 for one or more wells 804 formed therein. The three-dimensional reservoir model 800 can be a compilation of a plurality of gridded fracture planes, such as the multi-well gridded fracture planes 700 detailed in FIG. 7. The system 10 can generate the three-dimensional reservoir model 800, thereby allowing an operator to visualize the principal fractures and/or the low conductivity fracture patch(es) 806. One or more production, well placement, and/or forecasting decisions can be made in view of the three-dimensional reservoir model 800.

While FIG. 8 details the three-dimensional reservoir model 800 having multiple wells 804 formed therein, it is within the scope of this disclosure for system 10 to generate a three-dimensional reservoir model 800 detailing any number of wells 804 including, but not limited to, one, two, three, five, six, and ten, etc. Further, the system 10 can generate a three-dimensional reservoir model 800 having one or more selectable options, for example dynamically principal fracture overlap regions, secondary fractures, and/or near well high permeability regions.

Figure 9:
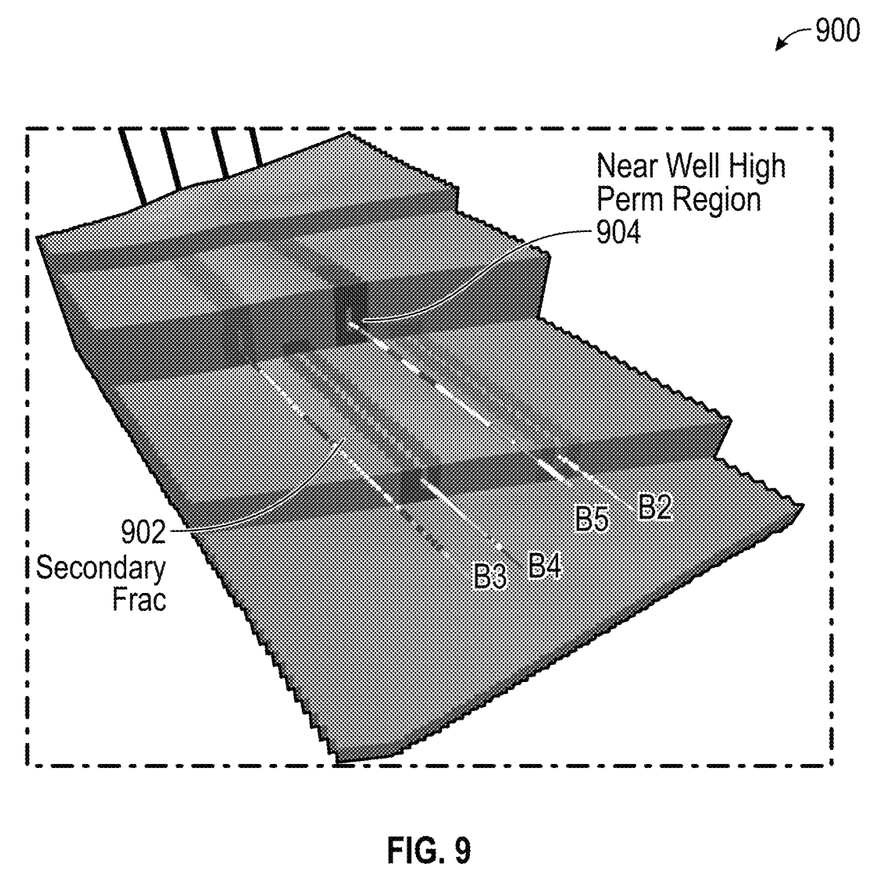
FIG. 9 is a three-dimensional reservoir model detailing secondary fractures and high permeability regions according to at least one instance of the present disclosure.

FIG. 9 illustrates a three-dimensional reservoir model detailing secondary fractures and high permeability regions according to at least one instance of the present disclosure. As discussed above, a three-dimensional reservoir model 900 can be dynamically generated by the system, thereby allowing an operator to visualize a complete model, a portion of the model, and/or one or more layers of the model. The three-dimensional reservoir model 900 can display one or more secondary fractures 902 and the near well high permeability regions 904 within the three-dimensional reservoir model 900. The one or more secondary fractures 902 and/or the near well high permeability regions 904 can allow one or more production, well placement, and/or forecasting decisions can be made in view of the three-dimensional reservoir model 900.

While FIG. 9 details the three-dimensional reservoir model 900 having multiple wells formed therein, it is within the scope of this disclosure for system 10 to generate a three-dimensional reservoir model 900 detailing any number of wells including, but not limited to, one, two, three, five, six, and ten, etc.

Figure 10:
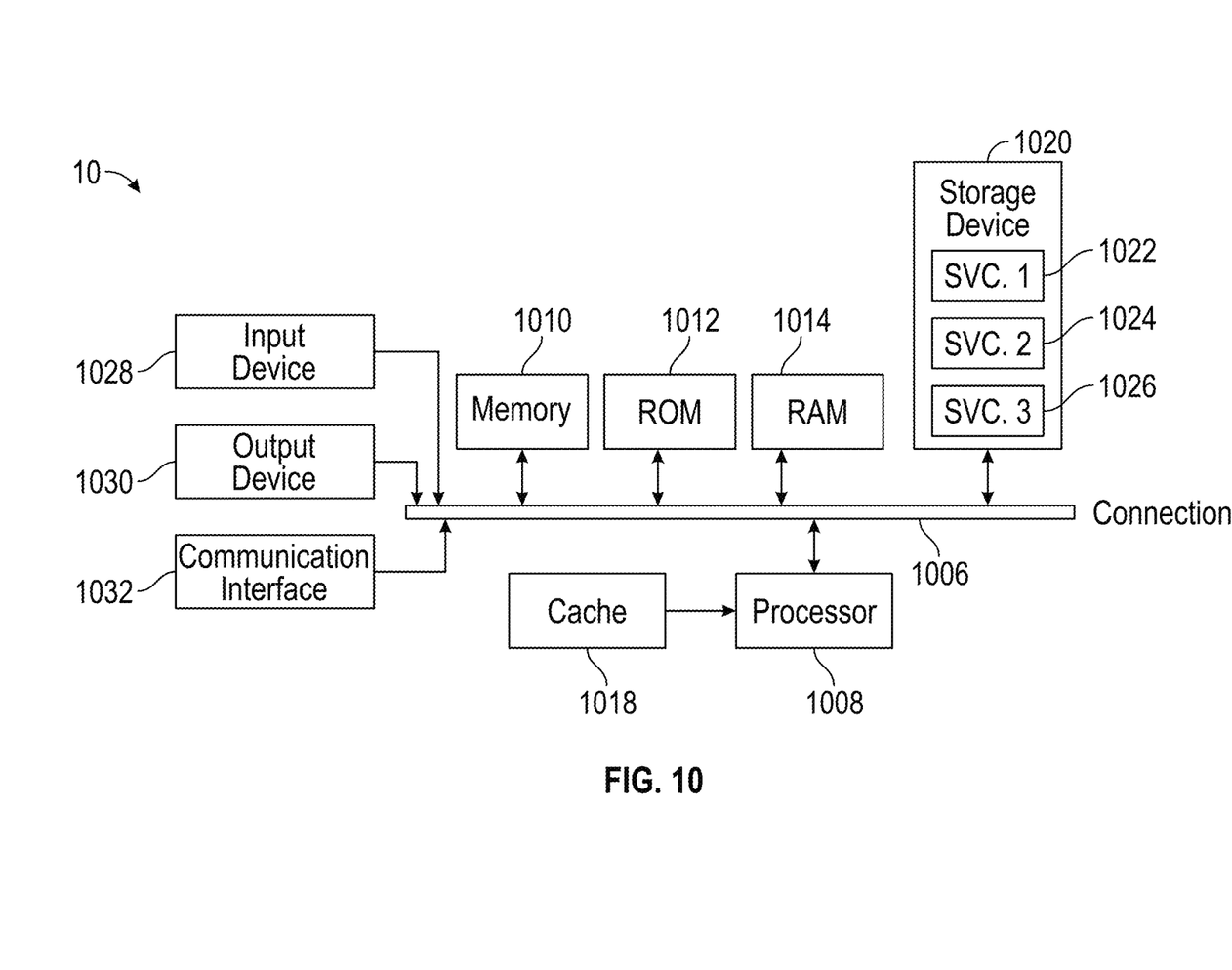
FIG. 10 illustrates an example computing system according to at least one instance of the present disclosure.

FIG. 10 illustrates an example computing system 10, which can be implemented as processing center or a server of processing center for implementing functionalities described with reference to FIGS. 1-9. System 10 can include components in electrical communication with each other using a connection 1006, such as a bus. System 10 includes a processing unit (CPU or processor) 1008 and connection 1006 that couples various system components including the system memory 1010, read only memory (ROM) 1012 and/or random access memory (RAM) 1014, to the processor 1008. System 10 can include a cache 1018 of high-speed memory connected directly with, in close proximity to, or integrated as part of processor 1008 System 10 can copy data from memory 1010 and/or storage device 1020 to cache 1018 for quick access by processor 1008. In this way, cache 1018 can provide a performance boost that avoids processor 1008 delays while waiting for data. These and other modules can control or be configured to control processor 1008 to perform various actions. Other system memory 1010 may be available for use as well. Memory 1010 can include multiple different types of memory with different performance characteristics. Processor 1008 can include any general purpose processor and a hardware or software service, such as service 1 1022, service 2 1024, and service 3 1026 stored in storage device 1020, configured to control processor 1008 as well as a special-purpose processor where software instructions are incorporated into the actual processor design. Processor 1008 may be a completely self-contained computing system, containing multiple cores or processors, a bus, memory controller, cache, etc. A multi-core processor may be symmetric or asymmetric.

To enable user interaction with system 10, an input device 1028 can represent any number of input mechanisms, such as a microphone for speech, a touch-sensitive screen for gesture or graphical input, keyboard, mouse, motion input, speech and so forth. An output device 1030 can also be one or more of a number of output mechanisms known to those of skill in the art. In some instances, multimodal systems can enable a user to provide multiple types of input to communicate with system 10. Communications interface 1032 can generally govern and manage the user input and system output. There is no restriction on operating on any particular hardware arrangement and therefore the basic features here may easily be substituted for improved hardware or firmware arrangements as they are developed.

Storage device 1020 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1014, read only memory (ROM) 1012, and hybrids thereof.

Storage device 1020 can include service 1 1022, service 2 1024 and/or service 3 1026 for execution by processor 1008 to cause processor 1008 to carryout functionalities described above with reference to FIGS. 1-9. Other hardware or software modules are contemplated. Storage device 1020 can be connected to connection 1006. In one aspect, a hardware module that performs a particular function can include the software component stored in a computer-readable medium in connection with the necessary hardware components, such as processor 1008, connection 1006, output device 1030, and so forth, to carry out the function.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

REFERENCES

All of the references cited herein are expressly incorporated by reference. The discussion of any reference is not an admission that it is prior art to the present invention, especially any reference that may have a publication data after the priority date of this application. Incorporated references are listed again here for convenience:
1. US-2011-0282635, "Stochastic Downscaling Algorithm and Applications to Geological Model Downscaling" (2011).
2. US-2012-0101786, "Method for Parameterizing and Morphing Stochastic Reservoir Models" (2012).
3. US-2012-0265512, "Updating Geological Facies Models Using the Ensemble Kalman Filter" (2012).
4. US-2013-0110484, "Reservoir Modelling with Multiple Point Statistics from a Non-Stationary Training Image" (2013).
5. US-2014-0114632
6. US-2015-0317419
7. US-2017-0011149
8. US-2018-0364381

What is claimed is:

1. A method for modelling a reservoir, the method comprising:
    receiving, at a processor, a data set relating to one or more wells within the reservoir;
    processing, via the processor, the data set to identify one or more hydraulic fractures extending from the one or more wells into the reservoir;
    categorizing, via the processor, the one or more hydraulic fractures as one or more principal fractures or one or more secondary fractures;
    identifying, via the processor, the one or more principal fractures as Type 1 principal fractures or Type 2 principal fractures based on a correlation with far field pressure data, wherein the Type 2 principal fractures have a lower fracture conductivity, stronger stress dependent permeability reduction, and weaker drainage in far field compared to the Type 1 principal fractures;
    identifying, via the processor, a near well high permeability region for each of the one or more wells;
    generating, via the processor, a gridded fracture plane for a plurality of predetermined depths of the one or more wells, the gridded fracture plane including a fractured region and an unfractured region;
    determining, via the processor, a fracture permeability region;
    assembling, via the processor, the gridded fracture plane for each of the plurality of predetermined depths, the fracture permeability regions, and the near well high permeability region for each of the one or more wells;
    generating, via the processor, a three-dimensional reservoir model based on the assembled gridded fracture plane for each of the plurality of predetermined depths, the fracture permeability regions, and the near well high permeability region for each of the one or more wells.

2. The method of claim 1, wherein the data set includes at least one of production data, monitor well pressure readings, image logs, distributed acoustic sensing (DAS), distributed temperature sensing (DTS), interference test, tracer, time lapse geochemistry, and/or microseismic.

3. The method of claim 1, wherein categorizing the one or more hydraulic fractures further comprises generating a uniform stimulated reservoir volume representation of the one or more secondary fractures.

4. The method of claim 1, wherein the gridded fracture plane for each of the plurality of predetermined depths includes each of the one or more wells.

5. The method of claim 1, the fracture permeability region includes three regions, an effectively propped region, an ineffectively propped region, and an unpropped region.

6. The method of claim 5, wherein a fracture permeability of each fracture permeability region is reduced by one or two order of magnitude as the fracture permeability region extends away from the one or more wells.

7. The method of claim 1, further comprising selecting one or more future well locations based at least in part on the three-dimensional reservoir model.

8. The method of claim 7, further comprising drilling the one or more future well locations.

9. The method of claim 1, further comprising forecasting production of the one or more wells based at least in part on the three-dimensional reservoir model.

10. The method of claim 1, further comprising adjusting completion of the one or more wells based at least in part on the three-dimensional reservoir model.

11. A system comprising:
    a memory having computer-readable instructions stored therein; and
    one or more processors operable to execute the computer-readable instructions to:
        receive a data set relating to one or more wells within a reservoir;
        process the data set to identify one or more hydraulic fractures extending from the one or more wells into the reservoir;

categorize the one or more hydraulic fractures as one or more principal fractures or one or more secondary fractures;

identify the one or more principal fractures as Type 1 principal fractures or Type 2 principal fractures based on a correlation with far field pressure data, wherein the Type 2 principal fractures have a lower fracture conductivity, stronger stress dependent permeability reduction, and weaker drainage in far field compared to the Type 1 principal fractures;

identify a near well high permeability region for each of the one or more wells;

generate a gridded fracture plane for a plurality of predetermined depths of the one or more wells, the gridded fracture plane including a fractured region and an unfractured region;

determine a fracture permeability region;

assemble the gridded fracture plane for each of the plurality of predetermined depths, the fracture permeability regions, and the near well high permeability region for each of the one or more wells;

generate a three-dimensional reservoir model based on the assembled gridded fracture plane for each of the plurality of predetermined depths, the fracture permeability regions, and the near well high permeability region for each of the one or more wells.

12. The system of claim 11, wherein the data set includes at least one of production data, monitor well pressure readings, image logs, distributed acoustin sensing (DAS), distributed temperature sensing (DTS), interference test, tracer, time lapse geochemistry, and/or microseismic.

13. The system of claim 11, wherein categorize the one or more hydraulic fractures further comprises generate a uniform stimulated reservoir volume representation of the one or more secondary fractures.

14. The system of claim 11, wherein the gridded fracture plane for each of the plurality of predetermined depths includes each of the one or more wells.

15. The system of claim 11, the fracture permeability region includes three regions, an effectively propped region, an ineffectively propped region, and an unpropped region.

16. The system of claim 15, wherein a fracture permeability of each fracture permeability region is reduced by one or two order of magnitude as the fracture permeability region extends away from the one or more wells.

17. The system of claim 11, further comprising select one or more future well locations based at least in part on the three-dimensional reservoir model.

18. The system of claim 17, further comprising drill the one or more future well locations.

19. The system of claim 11, further comprising forecast production of the one or more wells based at least in part on the three-dimensional reservoir model.

20. The system of claim 11, further comprising adjust completion of the one or more wells based at least in part on the three-dimensional reservoir model.

21. A non-transitory computer-readable medium having computer-readable instructions, which when executed by one or more processors, cause the one or more processors to:

receive a data set relating to one or more wells within a reservoir;

processing the data set to identify one or more hydraulic fractures extending from the one or more wells into the reservoir;

categorize the one or more hydraulic fractures as one or more principal fractures or one or more secondary fractures;

identify the one or more principal fractures as Type 1 principal fractures or Type 2 principal fractures based on a correlation with far field pressure data, wherein the Type 2 principal fractures have a lower fracture conductivity, stronger stress dependent permeability reduction, and weaker drainage in far field compared to the Type 1 principal fractures;

identify a near well high permeability region for each of the one or more wells;

generate a gridded fracture plane for a plurality of predetermined depths of the one or more wells, the gridded fracture plane including a fractured region and an unfractured region;

determine a fracture permeability region;

assemble the gridded fracture plane for each of the plurality of predetermined depths, the fracture permeability regions, and the near well high permeability region for each of the one or more wells;

generate a three-dimensional reservoir model based on the assembled gridded fracture plane for each of the plurality of predetermined depths, the fracture permeability regions, and the near well high permeability region for each of the one or more wells.

\* \* \* \* \*